United States Patent [19]

Müller et al.

[11] Patent Number: 5,407,690
[45] Date of Patent: Apr. 18, 1995

[54] PROCESS FOR THE PRODUCTION OF A SEASONING SAUCE BASED ON OAT

[75] Inventors: Rudi Müller, Sinsheim; Johann Bohatiel, Wuestrenrot; Doris Blortz, Ilsfeld; Barbara Frank, Flein, all of Germany

[73] Assignee: CPC International Inc., Englewood Cliffs, N.J.

[21] Appl. No.: 134,244

[22] Filed: Oct. 8, 1993

[51] Int. Cl.⁶ ............................................... A23L 1/22
[52] U.S. Cl. ......................................... 426/18; 426/46
[58] Field of Search ..................................... 426/18, 46

[56] References Cited

U.S. PATENT DOCUMENTS

| | | | |
|---|---|---|---|
| 3,711,303 | 1/1973 | Luksas et al. | 99/145 |
| 3,912,822 | 10/1974 | Yokotsuka et al. | 426/44 |
| 4,028,470 | 6/1977 | Hayashi et al. | 426/11 |
| 4,115,591 | 9/1978 | Noda et al. | 426/7 |
| 5,141,756 | 8/1992 | Bajracharya et al. | 426/46 |

FOREIGN PATENT DOCUMENTS 0417481  8/1990  European Pat. Off. .

OTHER PUBLICATIONS

JPO Abstracts, Abstracting JP 58-193677, Abstract Publication Date Feb. 8, 1984.
JPO Abstracts, Abstracting JP 58-138356, Abstract Publication Date Nov. 9, 1983.
JPO Abstracts, Abstracting JP 57-186461, Abstract Publication Date Feb. 10, 1983.
JPO Abstracts, Abstracting JP 56-160966, Abstract Publication date Mar. 19, 1982.
JP-A-52 076 488 (Abstract) Patent Abstracts of Japan, vol. 1, No. 111 (C-027) 26 Sep. 1976.

*Primary Examiner*—Joseph Golian

[57] ABSTRACT

A process for the production of a seasoning sauce, which comprises oat grains as the substrate to result in a lighter colored sauce. Additionally, the level of salt present during a multi-step fermentation is controlled using a relatively low salt brine.

7 Claims, No Drawings

PROCESS FOR THE PRODUCTION OF A SEASONING SAUCE BASED ON OAT

BACKGROUND OF THE INVENTION

1. Field of the Invention

The invention relates to a process for the production of a seasoning sauce similar to soy sauce.

2. Description of Related Art

It is well known to produce soy sauce by a fermentation process in which soybeans, in the form of whole beans or crushed, defatted soybeans, and optionally wheat, usually in the form of a roasted, crushed grain, and salt are used in varying proportions, and, on the basis of the kind of malt an enzyme-containing, fungus-covered substrate, referred to as koji, is produced. This is then mashed with salt water and subjected to a multi-step fermentation, comprising a hydrolytic process with lactic acid and alcoholic fermentation, followed by a maturing phase. The fermentation organisms used are the hypha fungi of the strain *Aspergillus oryzae* or *Asp. soyae* for the koji production, as well as the salt-tolerant lactococci *Pediococcus halophilus* and the yeast *Zygosaccharomyces rouxii* in the fermentation phase.

Contrary to former methods, where the natural accompanying flora effected the fermentation, modern processes use defined starter cultures. In the case of genuine, fermented sauces, no mineral acid is employed for accelerating the decomposition of the raw plant materials. This is done exclusively by means of enzymatic hydrolysis effected by the fungal enzymes formed during the koji phase. In recent developments, immobilized enzymes or immobilized microorganisms are used for fermentation. However, when the fermentation period is shortened and the salt contents are reduced during mashing, the taste qualities of the sauces thus achieved are not as good as those produced according to the former process. After a prolonged maturing phase (3 to 6 months) the mash is refined by squeezing, heating, turbidity sedimenting and precoat filtration so as to yield a stable ready-to-eat sauce. Traditionally prepared soy (shoyu) sauce has a dark color and a salty, full, roasty and malty flavor which is somewhat unfamiliar to Western taste.

JP-A-52-76488 describes a process for the production of a seasoning sauce on the basis of protein-containing raw materials such as soybeans, soybean protein, wheat, barley, wheat gluten, corn gluten, fish protein, milk protein, etc., and carbohydrate-containing raw materials such as sorghum, rice bran, wheat bran, potato, molasses, starch residues, etc., from which a koji is made using suitable koji organisms such as *Aspergillus soyae* and *Aspergillus oryzae*, which is fermented in a saline solution at temperatures between 30° and 55° C.

U.S. Pat. No. 4,115,591 describes a process for the production of a koji wherein a koji fungus is cultivated in a modified koji substrate at a temperature of 20° to 40° C. for 30 to 100 hours in the presence of 0.05 to 8% of a salt of an aliphatic carboxylic acid having up to four carbon atoms. The koji substrate is selected from the group consisting of soybeans, defatted soybeans, gluten, rice, wheat, wheat bran, barley, oats, corn, fish meal and other products. The resulting koji is used for producing fermented food products such as soy sauce, miso and sake, by fermentation in a 22% salt solution at 30° C. for 150 days.

EP-A-417 481 describes a process for the production of a soy sauce by fermentation on the basis of a koji produced by fermenting a mixture of crushed soybeans and wheat by means of a koji culture, according to which the koji is hydrolyzed in aqueous suspension with the enzymes obtained during the fermentation with the koji culture, at 45° to 60° C. for 3 to 8 hours, whereupon the mixture is subjected to a four to eight-week fermentation after the addition of sodium chloride in an amount necessary to obtain a salt content of 15 to 19%.

As regards the prior art, reference is also made to U.S. Pat. No. 3,912,822, which describes a process for the production of a protein hydrolyzate having a high glutamic acid content by means of a proteolytic enzyme.

An object of the present invention is to produce a seasoning sauce similar to soy sauce but which has a lighter color, is less roasty in flavor and more neutral but harmonious so as to be better adapted to the Western trend of taste, and which also has a salt content as low as possible. Another object is to shorten the production process to a period of less than 3 months.

It has been surprisingly found that the problems which currently exist can be solved by means of certain process control using raw materials not traditionally employed for soy sauce fermentation, namely by using an enzyme-containing fungus-covered substrate (koji) consisting of dehulled and soaked oat grains. According to the invention, such a koji is mashed with a brine relatively low in salt, and the fermentation is then carried out in several steps.

SUMMARY OF THE INVENTION

The present invention discloses a process for the production of a seasoning sauce which comprises oat grains as the substrate to result in a lighter colored sauce. Additionally, the level of salt present during fermentation is controlled by using a relatively low salt brine, and the fermentation is carried out in several steps to result in a product which, compared to conventional soy sauce, is relatively low in salt and is less roasty in flavor.

DETAILED DESCRIPTION

The process according to the invention for the production of a seasoning sauce, comprises an enzyme-containing, fungus-covered substrate which is initially mashed with water containing sodium chloride, the mash is subjected to fermentation for a prolonged period of time and then processed by squeezing, pasteurizing and filtration, and is characterized in that A) dehulled, soaked oat grains are used as the substrate, B) mashing is carried out with brine, so that the salt content in the mash is from about 4 to about 12%, preferably about 7 to about 8%, and C) the fermentation is carried out in several steps at temperatures decreasing from about 40° to about 45° C. in the first step to room temperature in the last step for about 8 to about 12 weeks.

The enzyme-containing, fungus-covered substrate used as the starting material and technically referred to as koji, is produced in a traditional manner by using dehulled, soaked oat grains as the carbohydrate-containing raw material. In this case, it is possible to proceed for example, in accordance with the description set forth in EP-A1-417 481. In the present invention, it is useful to employ a starter culture, preferably *Aspergillus oryzae*. A dense mycelium forms on the substrate, and this fungus-covered, enzyme-containing substrate, referred to briefly as koji, is then mashed with brine and subjected to fermentation. It is also possible to add a yeast, preferably *Zygosaccharomyces rouxii*, during the submerged mash fermentation step.

The koji enzymes are activated by the elevated initial temperature in the submerged mash fermentation phase, so that no further enzyme addition is necessary in order to accelerate the process.

According to the invention, oat grains are used as the starting material. However, it can be useful to admix up to 20% by weight of other raw material components such as wheat, crushed soybeans, barley, rice, corn, and any combinations thereof.

According to the present invention, the mashing is carried out using brine, and a weight ratio of koji to salt water or brine of approximately 1:1 being generally observed. The salt content of the mash is generally from about 4 to about 12%, preferably about 7 to about 8% by weight.

During the submerged fermentation phase the alcoholic fermentation of enzymatically saccharified starch is controlled in a well-calculated manner according to the invention.

For the present process, it is advantageous to remove the fermentation alcohol formed during fermentation and the resulting $CO_2$ fermentation gas from the mash. Fermentation gas and fermentation alcohol can be removed by any known means of vacuum evaporation. Such a separation of ethanol and carbon dioxide from the fermentation mash has not previously been carried out in soy sauce production. In general, such a separation is not necessary for the complete fermentation of the mash, since when the conventional raw materials (soybeans, roasted wheat) are used the alcohol content of the mash does not increase to such an extent that it reaches the range in which the yeast is inhibited. However, it has been found that when oats are used a major amount of sugar is released, so that it is useful to stop the fermentation when the residual sugar content of the mash is still high due to these fermentation products having an inhibiting effect on yeast. By doing this, a desired degree of fermentation is achieved. This process step also provides the possibility of obtaining novel seasoning liquids which have a desired residual sugar content and a corresponding taste profile, on the other hand.

According to a preferred embodiment, the invention proceeds in such a way that the mash fermentation is carried out in a first step at a temperature of from about 40° to about 45° C. for approximately 4 to 21 days, preferably about 8 to 14 days; in a second step at a temperature of from about 28° to about 32° C. for approximately 2 to 4 weeks, and in a third step at room temperature, from about 18° to about 25° C., for about 2 to 6 weeks.

The mature mash is processed as usual by press-filtration, heating and optionally clarification by membrane filtration. The clear seasoning liquid can be preconcentrated for drying. The resulting paste is then mixed with salt and other carrier substances and subsequent vacuum-dried or spray-dried.

The following is an example of the present invention, and is not meant to be limiting in any way.

EXAMPLE 1000 g of dehulled oat grain were soaked in water for 2 hours and then autoclaved at 120° C. for 15 minutes. The sterile substrate was subsequently inoculated with 0.5% of a spore suspension of *Aspergillus oryzae* (culture obtained from the German collection of microorganisms, Braunschweig, DSM 1863). The fermentation of the substrate in a bioreactor required a constant temperature of 30° C., high humidity and good aeration. It took about 50 hours until a white mycelium had covered the grains and a typical pungent fungal odor of the koji was smelled.

The koji was mashed with an amount of brine, so that 7% salt is present in the mash which was fermented in a fermentation vessel at 42° to 45° C., accompanied by occasional intermixing, for 12 days. The batch was then inoculated with the yeast *Zygosaccharomyces rouxii* (salt-adapted, culture obtained from the German collection of microorganisms, Braunschweig, DSM 2531). After further fermentation of the batch at 30° C., which was accompanied by the release of fruity flavor qualities, the alcohol content increased to 4% within 12 days.

The fermentation alcohol of this mash was then drawn off under vacuum at 48° C. in a rotary evaporator and after another yeast addition it was allowed to further ferment at 30° C. After 12 days, the alcohol content of the mash increased again to 2.5% and the pH had dropped from an initial value of 5.8 to 4.5-4.6.

For maturing the batch was stored another 4 weeks at room temperature and then processed.

For this purpose, the mash liquid was squeezed under pressure, pasteurized and then clarified by means of membrane filtration (microfiltration or ultrafiltration). The resulting seasoning liquid had a light color and neutral taste.

We claim:

1. A process for the production of a seasoning sauce, which comprises mashing a fungus-covered, enzyme-containing substrate with brine, subjecting the mash to fermentation for a prolonged period of time and then processing the fermented mash by squeezing, pasteurizing and filtration, such that
    a) dehulled, soaked oat grains are used as the substrate;
    b) mashing is carried out with brine of a low salt content, so that the salt content in the mash is from about 4 to about 12%; and
    c) the fermentation is carried out in three stages; a first stage is at a temperature of from about 40° to about 45° C. for about 4 to 21 days, a second stage is at a temperature of from about 28° to 32° C. for about 2 to 4 weeks, and a third stage is at room temperature of from about 18° to about 25° C. for 2 to 6 weeks.

2. The process of claim 1 wherein the salt content in the mash is from about 7 to about 8% by weight.

3. The process of claim 1, wherein carbon dioxide gas and alcohol which result from the fermentation step are withdrawn from the mash during the fermentation step.

4. The process of claim 3, wherein the carbon dioxide gas and alcohol are withdrawn by means of vacuum evaporation.

5. The process of claim 1, wherein the substrate further comprises up to 20% by weight of a component chosen from the group consisting of wheat, crushed soybeans, barley, rice, corn and any combination thereof.

6. The process of claim 1, which further comprises one or more microorganisms from the group consisting of *Aspergillus oryzae*, *Zygosaccharomyces rouxii* and combinations thereof during the process.

7. The process according to claim 6, wherein a starter fungus is added to the substrate before mashing and allowed to grow until a dense mycelium has developed and a yeast is added in the mash fermentation step.

* * * * *